(12) United States Patent
Farah

(10) Patent No.: US 6,363,494 B1
(45) Date of Patent: Mar. 26, 2002

(54) SYSTEM AND METHOD FOR CHARACTERIZING AND REPAIRING INTELLIGENT SYSTEMS

(75) Inventor: Jeffrey Joseph Farah, North Brunswick, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/624,248

(22) Filed: Jul. 24, 2000

Related U.S. Application Data

(63) Continuation of application No. 09/100,609, filed on Jun. 19, 1998, now Pat. No. 6,122,752.

(51) Int. Cl.$^7$ .............................................. G06F 11/00
(52) U.S. Cl. ............................................ 714/2; 710/29
(58) Field of Search ............................. 714/2, 4, 8, 10, 714/12, 13, 15, 21, 25, 26, 37, 39, 47, 48; 710/5, 29

(56) References Cited

U.S. PATENT DOCUMENTS

| | | | |
|---|---|---|---|
| 4,740,969 A | * 4/1988 | Fremont | 714/15 |
| 5,159,597 A | * 10/1992 | Monahan et al. | 714/2 |
| 5,664,088 A | * 9/1997 | Romanovsky et al. | 714/13 |
| 5,740,357 A | * 4/1998 | Gardiner et al. | 714/57 |
| 6,012,148 A | * 1/2000 | Laberge et al. | 714/2 |
| 6,044,475 A | * 3/2000 | Chung et al. | 714/15 |
| 6,105,148 A | * 8/2000 | Chung et al. | 714/16 |
| 6,122,752 A | * 9/2000 | Farah | 714/2 |
| 6,230,282 B1 | * 5/2001 | Zhang | 714/6 |

* cited by examiner

Primary Examiner—Nadeem Iqbal
(74) Attorney, Agent, or Firm—Oliff & Berridge, PLC

(57) ABSTRACT

System and methods for performing actions include detecting a particular state of a given system after the system performs various actions to transition the system from previous states to subsequent states. The system then compares detected states to expected states of the system. If a particular detected state differs from a related expected state, then one or more actions are performed to cause the system to transition from the detected state to a recovery state. The recovery actions performed are determined using one or more experience nodes storing historical recovery information.

22 Claims, 8 Drawing Sheets

SYSTEM AND METHOD FOR CHARACTERIZING AND REPAIRING INTELLIGENT SYSTEMS

This is a Continuation of application Ser. No. 09/100,609 filed Jun. 19, 1998, now U.S. Pat. No. 6,122,752. The entire disclosure of the prior application(s) is hereby incorporated by reference herein in its entirety.

BACKGROUND OF THE INVENTION

1. Field of Invention

This invention relates to error recovery systems, and in particular to characterizing and repairing intelligent systems using historical behavior of the systems.

2. Description of Related Art

Intelligent systems such as programmable robots and distributed networks, and even more abstract products such as software programs, are built according to manufacturing tolerances. For example, a machine is generally built to within certain design tolerances for component size and fit, although it may function within broader specifications. However, as the machine interacts with its environment, the machine's performance may degrade. For example, physical parts will wear out over time so that the machine will react differently to the same stimuli at different times.

Software programs should behave the same way all the time because they have no "moving parts" to degrade. However, in intelligent networks, as more components are added to the network or as existing components are upgraded, interactions of the components may become more complex. Thus, there is a possibility that control software may react differently over time. For example, in a new computer system the task of downloading a file may complete with no problems. However, if some components of software or hardware are upgraded, such as with a new operating system or storage media, a download of the same file may not complete because of the changes in the system. Further, as the physical machines on which the software runs begin to age, electronic errors may occur in hardware components with a corresponding effect on the operation of the software and overall system.

While eventual system failures can therefore be expected in a variety of intelligent systems, when they occur the process of identifying which hardware component or which software module failed can be very difficult and time consuming. The conventional approach for repairing intelligent systems is to essentially tear down a piece of equipment suspected to be faulty. That is, the network or physical component is taken offline, and its components are analyzed piece by piece until the defective part and source of error is identified. This method of error detection and recovery is very time consuming, and because it is intrusive can lead to further errors in the machine or network, making recovery even more difficult during the attempted diagnosis.

The invention relates to techniques for controlling and characterizing systems that can create self-learned error recovery plans for the systems.

In various exemplary embodiments, techniques for performing actions in a system include detecting a particular state of the system after the system performs an action transitioning from a previous state to the particular state, then comparing the detected state to an expected state of the system. If the detected state differs from the expected state, then one or more actions are performed to cause the system to transition from the detected state to a desired, or recovery, state.

In operation, recovery actions performed are determined in part by a trigger, which describes the actions of the system leading to the detected state and further by one or more experience nodes storing recovery information including at least information relating to triggers.

SUMMARY OF THE INVENTION

In view of the above limitations for maintaining intelligent systems, the invention relates to a system and method for characterizing and repairing intelligent systems which creates a self-learned error recovery plan for the network. As the system evolves or interacts with the environment, and encounters errors which force it to take action to overcome the error, the error recovery plan is updated and stored in an experience node. The sum of the experience nodes becomes the intelligent system's experience map.

The invention also allows the error recovery plan to be stored compactly to minimize memory requirements in network nodes- for instance, local hard drive or other media. The experience nodes can then be easily searched and the results from a failed network A, for example, can be compared to a second network B or subsequent networks built with similar components.

In terms of the invention's general environment, the generation of the experience map is based in part on the fact that each intelligent machine in a network environment is capable of executing a finite set of atomic actions, actions that can not be decomposed into other actions. During the execution of the atomic actions, an error may occur. That is, the intelligent machine may proceed from an error-free state to an error state. Once the intelligent machine arrives in the error state, it must execute one or more atomic actions to return to the error free state. Therefore, the intelligent machine will traverse a selected path through the space of atomic actions to recover to the error free state. The path and the specific atomic actions along the path make up an error recovery plan.

Since each atomic action when executed can lead to an error, each atomic action can be designated as a starting point in an experience node. Then, the error recovery plan will become a part of that experience node. However, each experience node can have more than one error recovery plan, because more than one error can occur during the execution of each atomic action.

The experience node can be represented as a series of interconnected nodes, with the atomic action as the starting node. The paths returning to an error free state are reflected in the connections between the remaining internal nodes of the experience node. Which particular path the intelligent machine will take to recover from an error is determined by a routing key. The routing key is based on conditions existing at the start node prior to the error.

The experience map thus contains the set of possible errors and the corresponding error recovery plans, including the paths of atomic actions taken to return to an error free state. Graphically, the experience map can be represented by a three-dimensional topographical graph with axes for frequency of execution of the error recovery plan, the set of error recovery plans, and the routing keys.

Each intelligent system will develop a unique experience map because each will react differently to the errors it encounters during operation and execution of its atomic actions. Therefore, the experience map can be used to provide diagnostic information and a unique electronic "fingerprint" for a particular intelligent system. For example, telecommunications networks may contain several routers that are used to route data packets from an originator to a destination. The data packets are routed according to information contained in a header of the data packet, and the programming of the routers. If 70% of the time the data packets are routed correctly according to the data packets and the programming, and 30% of the time the data packets are rerouted, the network may be experiencing one or more errors. By reviewing the experience map for each router in the network, the identity of the specific router encountering the error, or other component of the router encountering the error, can be identified.

BRIEF DESCRIPTION OF THE DRAWINGS

The invention is described in detail with reference to the following drawings, wherein like numerals refer to like elements and wherein.

DETAILED DESCRIPTION OF PREFERRED EMBODIMENTS

Figure 1:
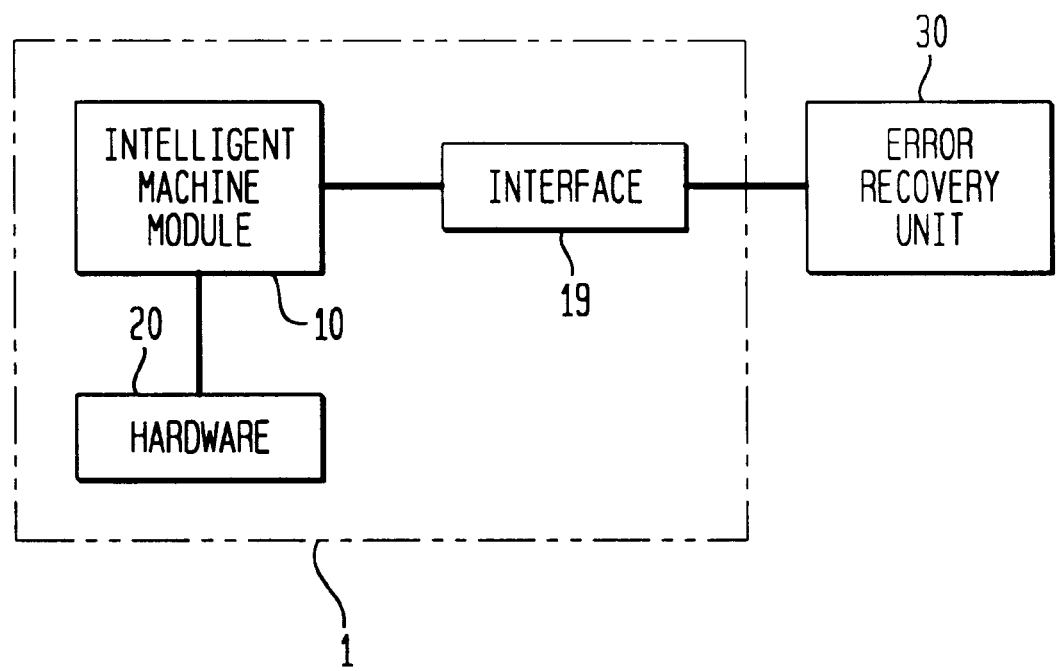
FIG. 1 illustrates an exemplary intelligent machine.

The invention provides a system and method for uniquely identifying and characterizing intelligent systems for analysis and repair. Examples of intelligent systems include robots, communication networks, neural networks and software programs. The invention can also be used to predict faults, given a specific operating environment. The invention also allows the determination of the place in the intelligent system where the fault occurred.

In terms of the general environment in which the invention operates, when intelligent systems operate within a particular environment and encounter errors, they will attempt to recover from the error. However, no two systems, although similar in construction, will over time always recover from the errors in the same manner. The invention takes advantage of this fact to generate unique experience maps that can be used subsequently to distinguish between intelligent systems, to characterize them and predict responses to external stimuli, including prediction of faults. The invention can also be used to locate the specific components that are the cause of the fault, and experience maps can be communicated between distributed units for comparative analysis of separate systems.

An intelligent system will execute specific actions that may be viewed from a macroscopic perspective. For example, a robot may be designed to stack crates in a warehouse. One set of macroscopic actions applicable to the robot might include "stack crate B on crate A." If an error occurs during the stacking operation, current conventional systems would declare an error in the macroscopic action "stack crate B on crate A" in a global sense. However, each macroscopic action includes a number of atomic actions such as "grasp crate A" and "lift crate A", for example. Thus, the actual error could be in the atomic action "grasp crate A" but conventional systems are not capable of discriminating errors at that level of detail.

Every intelligent system can undertake only a limited set of macroscopic or atomic actions. That is, there are a finite number, even if very large number, of actions that an intelligent system can perform. As these actions are executed in an environment, the intelligent system will learn when errors occur. That is, the intelligent system will learn an action or set of actions to go from a state in which an error has occurred to an error-free state, because the system learns new ways in which the actions can connect over its action space.

The action that caused the intelligent system to go from an error-free state to the error state is referred to as an error trigger. The action or sequence of actions to restore the intelligent system to an error-free state is referred to as an error recovery plan. Note that there can be several different error recovery plans to recover from the same error state, depending on the history of actions as stored in the experience node, the error trigger, and other factors.

To be useful, the intelligent system must store these experiences (i.e., the triggers and the corresponding error recovery plans) in a memory where they can be recalled when needed. In the invention, the repository for the information is an experience node.

A fundamental advance of the invention, and one that has not been recognized in the art, is the ability to descend to and parse the set of macroscopic actions that the intelligent system can perform into a series of low-level atomic actions. Then, when an error occurs, the specific atomic action at which the error occurred, and the specific action (or actions) necessary to return to an error-free state, can be specified at that precise juncture. This minimizes the amount of time and effort required to perform diagnostics on the system, since the hierarchical level at which the diagnosis is performed is much lower.

In the above-described environment of the invention, an experience node can be generated for every atomic action an intelligent system is capable of executing, along with a path or paths necessary to go from that atomic action to another atomic action. Further, recovery from an error may involve traversing at least part of the same path between a first atomic action and a second atomic action as would be traversed to recover from another error. Thus, the number of distinct error recovery paths can be reduced, thereby minimizing the amount of memory devoted to storing the experience nodes.

When the intelligent system transitions from one atomic action to another action during error recovery, the specific error being recovered from will dictate which path to take. This makes the inventive error recovery process an order of magnitude faster than in current systems. Furthermore, because the errors can be stored as binary information (yes/no error bits), the process requires much less memory than in conventional systems. Finally, in terms of processing resources the search space is reduced from a factorial to a worst-case quadratic condition.

The experience map of the invention thus represents the totality of experience nodes and accumulated behavior for an intelligent system. The information contained in the experience map includes the following data: (1) the frequency of occurrence of an error; (2) the frequency of occurrence of an error recovery plan; and (3) the routing keys. Each intelligent system has a unique experience map that develops over time. The uniqueness of the experience map allows one intelligent system to be distinguished from another, by comparison of their experience maps. The experience maps are unique reflections of their systems because of the complexity of the experience nodes within the experience map, and their accumulation of idiosyncratic error behaviors over time.

As noted, each atomic action will eventually generate an experience node. Thus, if an intelligent system is limited to 10 atomic actions, there will be at most 10 experience nodes over time. In this work and in Petri Net theory, places, depicted as nodes (circles) with the identifier P#, represent the resulting or initial state information that is transformed by the execution of the atomic actions represented by transitions, and depicted as short lines or squares with the identifier T#.

The frequency of occurrence refers to the number of times that an error occurred and a specific error recovery plan was carried out. The routing key is the symbolic representation of an error, and defines the path to take to return to an error-free state. The routing key is determined by which predicate in the state information indicates an error is present. That is, as the intelligent system executes an action, it expects a certain state to be true at the end of the action. If the state is not true, then an error has occurred.

With this general background, FIG. 1 shows an exemplary intelligent system 1. The intelligent system 1 includes an intelligent machine module 10 and physical hardware (e.g., robotic arms, hands) 20. The intelligent machine module 10 contains a logical architecture that controls the intelligent system 1, in particular hardware 20. The intelligent system 1 also has associated with it an error recovery unit 30. In FIG. 1, the error recovery unit 30 is shown as a logical extension of the intelligent system 1, rather than being physically incorporated within the intelligent system 1 although it will be appreciated that other configurations are possible. The error recovery unit communicates with the intelligent system 1 through the interface 19.

Figure 2:
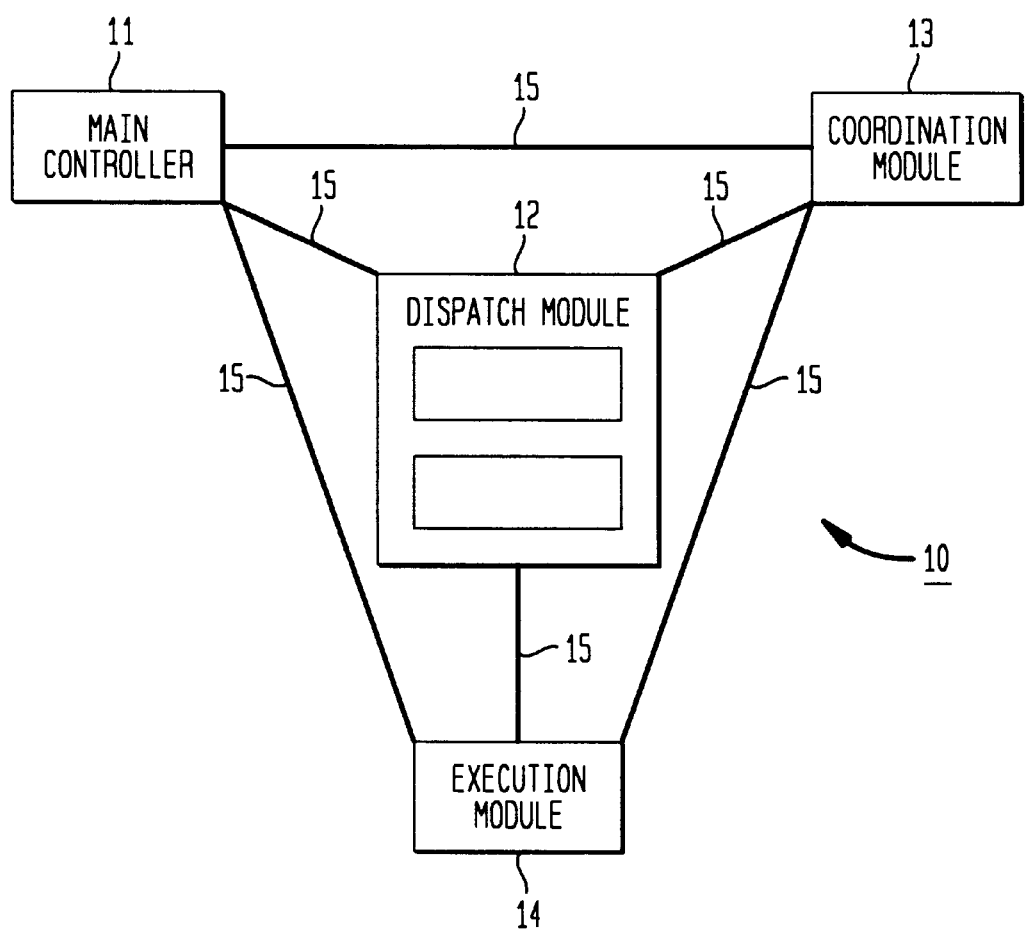
FIG. 2 illustrates an exemplary architecture of the intelligent machine of FIG. 1.

FIG. 2 shows an exemplary architecture for the intelligent machine module 10. A main controller 11 contains a representation of an environment in which the intelligent machine 10 functions, and a coordination module 13 that specifies commands for operation of the intelligent system 1. The main controller 11 also contains a general execution plan 17 for execution of the actions of the intelligent system 1. The coordination module 13 communicates with the main controller 11 over signal path 15 and via a dispatch module 12. The main controller 11 provides overall direction control for the intelligent system 1. For example, if the intelligent system 1 is a robot tasked to stack blocks in a warehouse, the main controller 11 would instruct the coordination module 13 to stack blocks A, B and C, in that order, for example.

The coordination module 13 develops detailed commands for the intelligent system 1, based on the overall direction control of the main controller 11, and sends the detailed commands to the execution module 14. The execution module 14 then executes the detailed commands on the physical hardware 20 that is part of the intelligent system 1.

FIG. 2 illustrates that the error recovery unit 30 takes advantage of the existing modules and communication paths of the intelligent system 1. By so doing, the error recovery unit 30 does not have to be programmed with the structure of the intelligent system 1 architecture. Instead, only the protocols executing in the dispatch module 12 need to be programmed into the error recovery unit 30.

Figure 3:
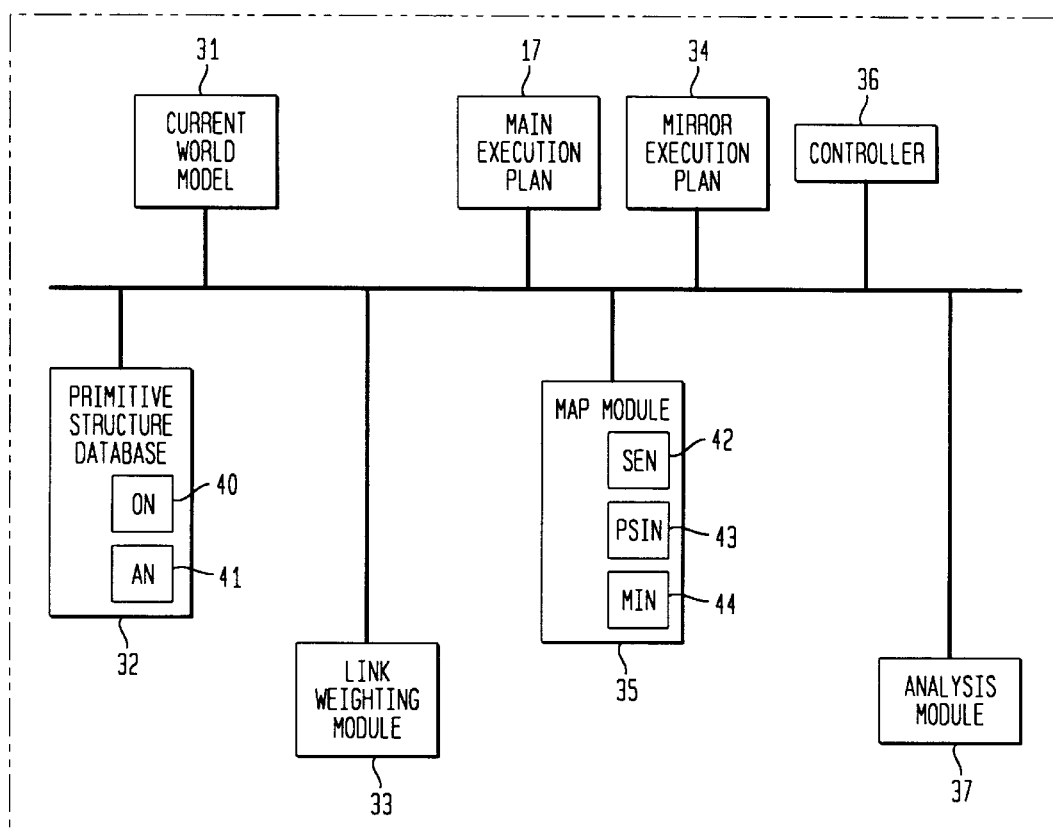
FIG. 3 illustrates a block diagram of an error recovery unit of FIG. 1.

FIG. 3 shows a functional diagram of the error recovery unit 30. In this embodiment, the error recovery unit 30 is illustrated a stand alone device. However, functionally the error recovery unit 30 is a logical extension of the physical system that makes up the intelligent system 1. The error recovery unit receives control signals from the main controller 16 of the intelligent system 1 via the dispatch module 12. The primitive structure database 32 contains object nodes 40 and activity nodes 41. The activity nodes 41 represent the atomic actions that are executable by the intelligent system 1. The object nodes 40 represent an object that has existed or currently exists in the environment in which the intelligent system 1 is functioning or has functioned. A link weighting module 33 assigns fuzzy-conditioned weights (F-weights), known to persons skilled in the art, to the activity in object nodes 40 in the primitive structure database 32. A mapping module 35 stores experience nodes 42, primitive structure interface nodes 43 and map interface nodes 44. A current world model 31 maintains a representation of the most current environmental information for the intelligent system 1. The mirror execution plan 34 is an execution model that parallels the general execution plan. A controller 36 containing an error recovery algorithm governs the overall operation of the error recovery unit 30.

Figure 4:
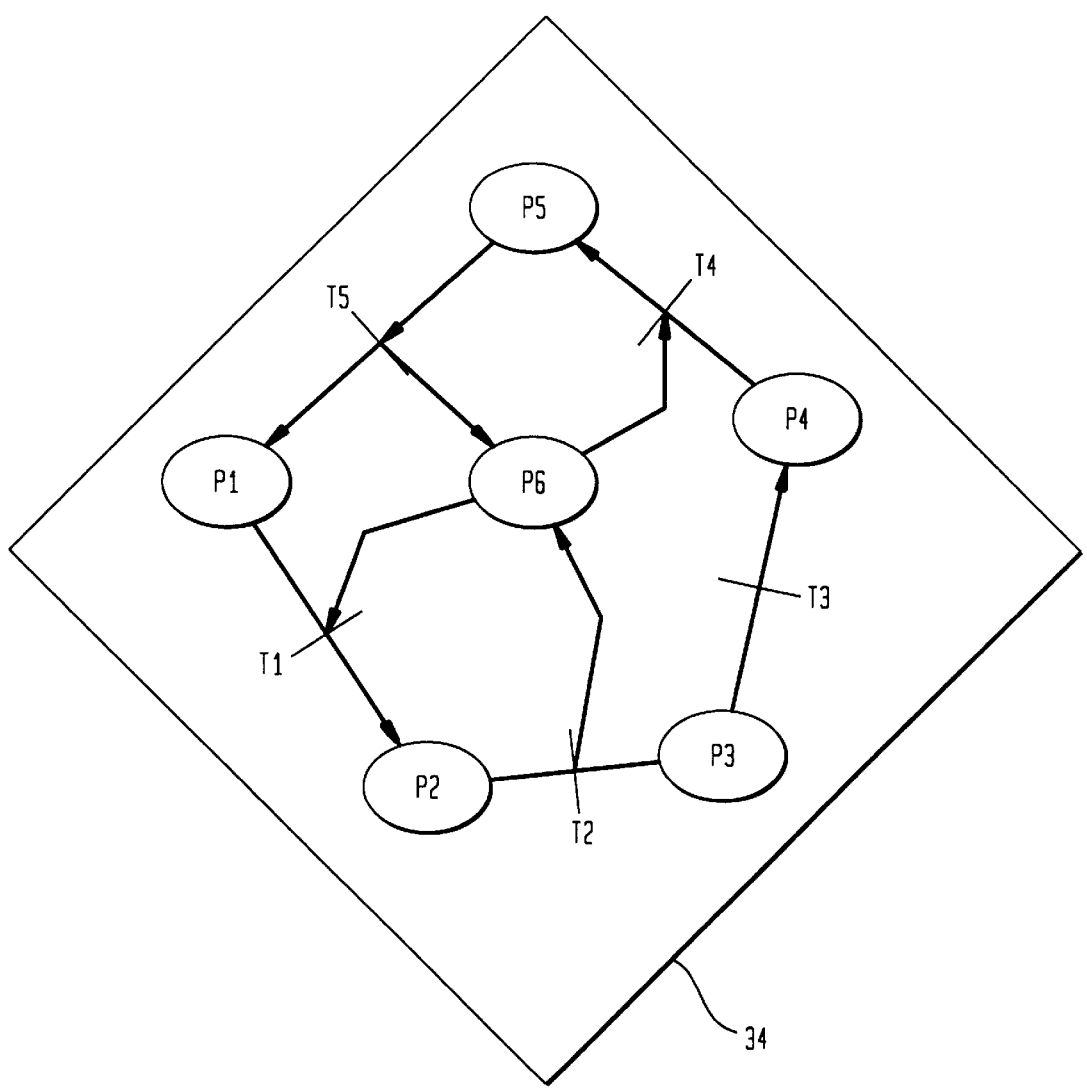
FIG. 4 illustrates a graphical representation of a mirror execution plan.

The mirror execution plan 34 is an exact copy of the general execution plan 17 of the intelligent system 1. FIG. 4 is a graphical representation of the mirror execution plan 34, shown as a Petri net model. In FIG. 4, the five transitions T1–T5 represent the subset of atomic actions executable by the intelligent system 1 that are needed to perform the task represented by the figure. The intelligent system 1 can transition between activity nodes 41 (i.e., perform a specific atomic action followed in sequence by another atomic action) along with paths connecting the state nodes P1–P6 which represent the states that enable the actions executed in the transitions and the states that result from the execution of those actions. When the intelligent system 1 transitions from one activity node 41 to the next, it encounters a transition. Thus there are five state transitions T1–T5. The transitions T1–T5 function to represent the atomic actions whose execution result in state changes. The monitoring of transitions for errors is maintained through connection to the map interface nodes 44 that reside within the mapping module 35. Task level errors occur exclusively during state changes. Hence, through the map interface node 44, it is possible to determine the exact location from which an error recovery would be enacted. However, the mirror execution plan is not used to actually detect errors. Instead, errors are detected by the main controller 11 of the intelligent system 1. The mirror execution plan simply allows the error recovery unit 30 to locate the starting point for error recovery.

Figure 5:
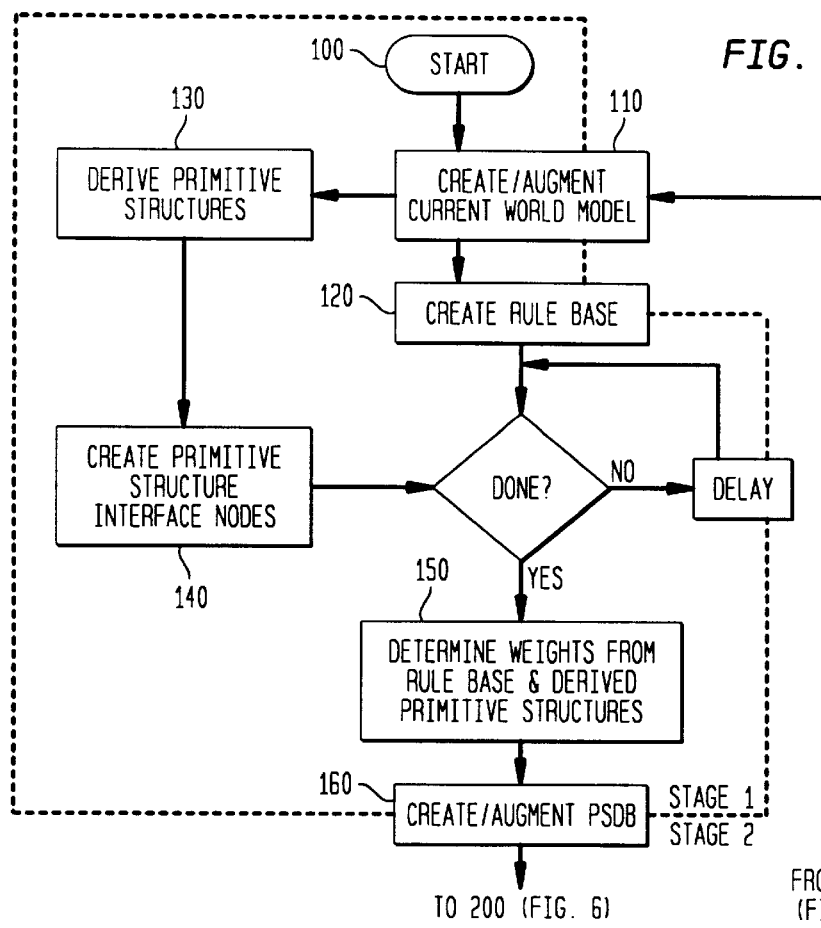
FIGS. 5–7 are flowcharts illustrating the error recovery algorithm.
Figure 6:
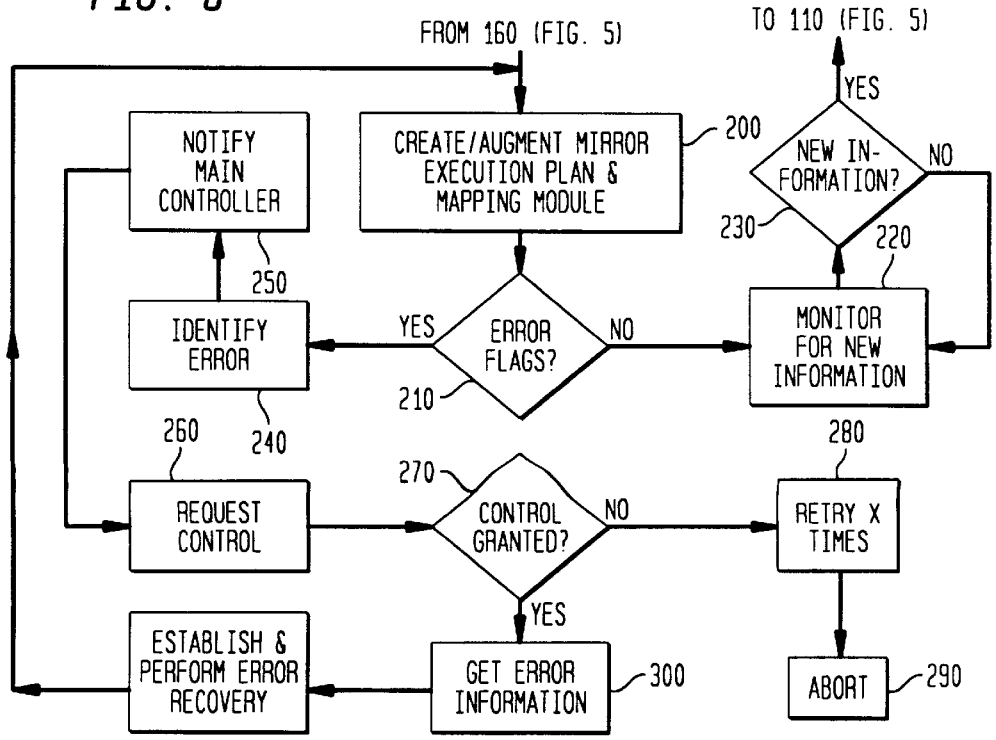
Figure 7:
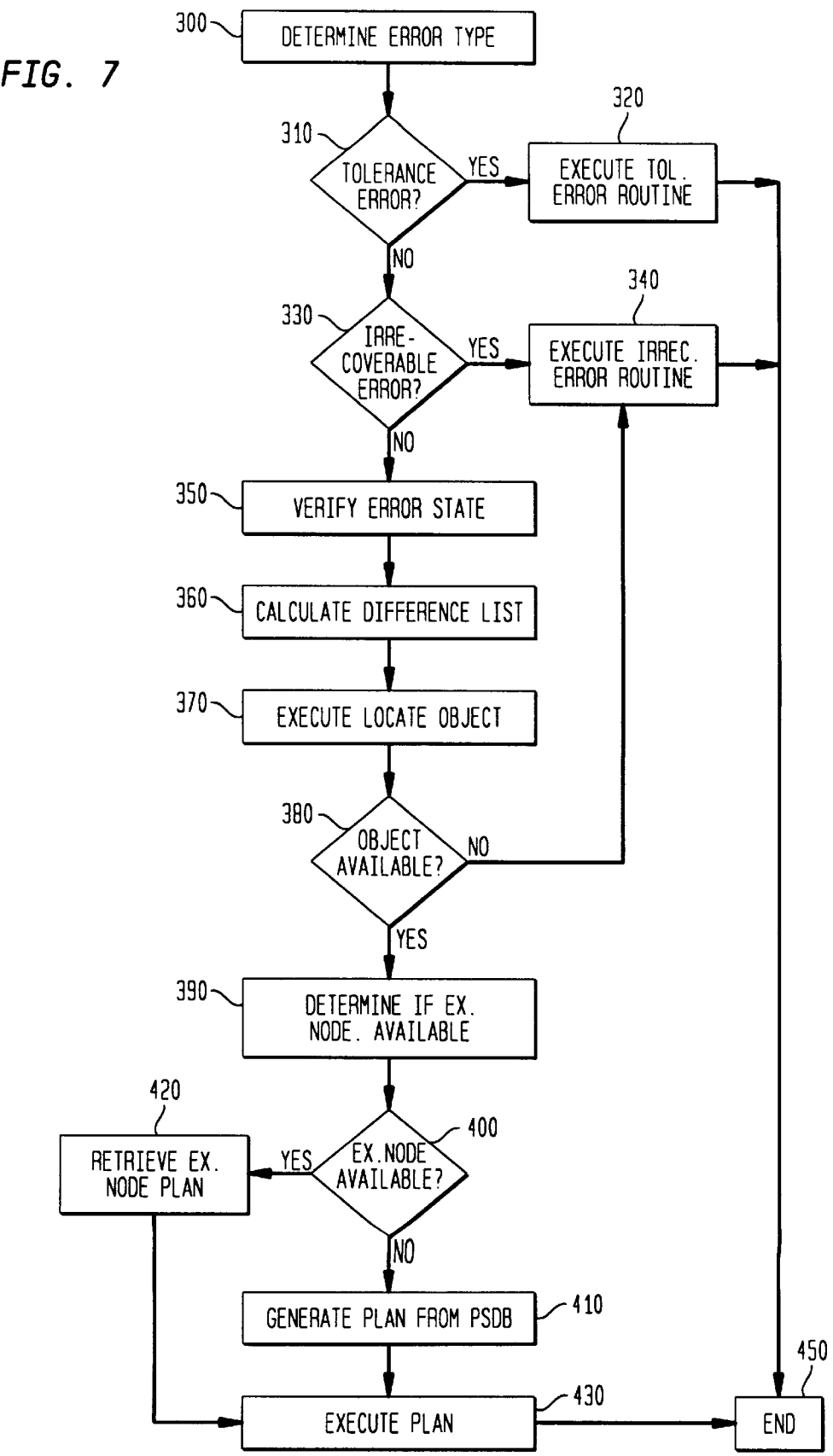

FIGS. 5–7 show the error recovery algorithm in detail. Using FIGS. 5A–5C the operation of the error recovery unit 30 will be explained. The process starts in step 100 (FIG. 5). In step 110, the controller 36 generates the current world model from the global world model. If the error recovery unit 30 error recovery algorithm is run for the first time the current rule model will be the same as the global rule model.

In step 120, the controller 36 generates or augments a rule by the length weighting module 33. The process then moves to step 130, where the controller 36 determines the underlying primitive structures for the primitive structure database 32. In step 140, the controller 36 creates primitive structure interface nodes for each primitive node. The process then moves to step 150, where the controller 36, using the rule base and the derived primitive structures, applies each set of nodes to the rule base, resulting in a relational weighting. In step 160, the controller 36 completes the primitive structure database 32 by assigning the relational weights and the intermediate connections.

FIG. 6 shows the processing of the error recovery unit 30 after operation of the intelligent system 1 begins. Following the initialization shown in FIG. 5, the process moves to step 200. In step 200, the controller 36 directs the creation of a mirror execution plan 34 corresponding to the general execution plan 17, including the establishment of map interface nodes 44. In step 210, the error recovery unit 30 determines if the main controller 11 of the intelligent system 1 has asserted an ERR FLAG. If the ERR FLAG is not asserted, the process moves to step 220. Otherwise, the process proceeds to step 240.

In step 220, the error recovery unit 30 monitors the introduction of information into the current model. In step 230, the controller 36 determines if the information is new information. If the information is new information, the process returns to step 110 of FIG. 5A and the information is processed to augment the primitive structure database 32 per step 120–S160. Otherwise, the process returns to step 220.

In step 240, the controller 36, using the ERR FLAG, attempts to identify the error from the information provided by the main controller 11. In particular, the controller 36 determines the mirror execution plan transition from which the error began, and activates the map interface nodes 44. The process then proceeds to step 250. In step 250, the controller 36 notifies the main controller 11 that an error has occurred. However, the main controller 16 will always register an error without an input from the controller 36. The error notification to the main controller 11 by the controller 36 ensures the continuity of error data transmission. Proceeding to step 260, the controller 36 requests control of the intelligent system 1 operations from the main controller 11 to prevent interference during an error recovery.

In step 270, the controller 36 determines if the main controller 11 has relinquished control of the intelligent system 1. If not, the process moves to step 280. Otherwise the process moves to step 300. In step 280, the controller 36 attempts a given number of times to gain control of the intelligent machine 31. In step 280, if the given number of attempts is completed without gaining control, the process moves to step 290. In step 290, the controller 36 aborts the process. In step 280, if control is achieved the process moves to step 300.

Moving to FIG. 7, in step 300 the controller 36 analyzes the error to determine the error type. The process then proceeds to step 310. In step 310 the controller 36 determines if the error is a tolerance error. If the error is a tolerance error, the process moves to step 320, otherwise the process moves to step 300. In step 320, the controller 36 executes the tolerance error routine. The process then proceeds to step 450. In step 330, the controller 36 determines if the error is a irrecoverable error. If so, the process moves to step 340. Otherwise the process moves to step 350. In step 340, the controller 36 executes the irrecoverable error routine. The process then moves to step 450.

In step 350, the controller 36 verifies the error state. The process then moves to step 360. In step 360, the controller 36 calculates the difference list. In step 370, the controller 36 executes a locate object routine. In step 380, the controller 36 determines if an object is available. If not, the process returns to step 340. Otherwise, the process then proceeds to step 390. In step 390, the controller 36 determines if an experience node is available. If an experience node is available, the process moves to step 420. Otherwise, the process moves to step 410. In step 410, the controller 36 generates an error recovery plan from the primitive structure database 32. The process then proceeds to step 430.

In step 420, the controller 36 retrieves an experience node from the primitive structure database. In step 430, the controller 36 executes the error recovery plan. In step 450, the error recovery process ends and controller 36 returns control of the intelligent system 1 to the main controller 16.

As noted above, the error recovery unit 30 uses, as a basic building block, an experience node 42, which reflects the actions the intelligent system 1 takes in recovering from an error. Thus, the experience node 42 contains the error recovery plan for a discrete action and provides an experience component for generating future error recovery plans. Experience nodes in different configurations are illustrated in FIGS. 8, 9 and 10A and 10B.

The invention takes advantage of the fact that there are a finite number of error types that must be accounted for in the error recovery plan. This limits the amount of memory required by the primitive structure database 32 of the error recovery unit 30 to store the error recovery plans.

The experience node permits the error recovery unit 30 to react in constant or real time to errors whose error conditions match those of errors that have been previously encountered by the intelligent system 1. An experience node 42 is defined only for each atomic action in an action node network. Each experience node 42 maintains a set of successfully executed error recovery plans and the conditions under which the error recovery plans were generated. That is, the experience node 42 maintains a set of successfully executed error recovery plans for errors that occur during execution of each atomic action. Hence, for an action node network comprising the $|\Sigma|$ nodes, there are $|\Sigma|$ maximum possible experience nodes 42.

The error recovery plans in each experience node 42 are stored in a connected di-graph, which is a symbolic representation of the experience nodes and the paths between the experience nodes, as illustrated in FIGS. 10, 11, 12 and 13. Symbolic error condition information identifies a path through the di-graph between a start node and a destination node. Once a particular error recovery plan has been incorporated into an experience node 42, the error recovery plan's symbolic error condition information is a key that identifies the error recovery plan, and thus makes the error recovery plan accessible in constant time for a subsequent error recovery request. If the symbolic error conditions that trigger the subsequent error recovery request match the key, an error recovery plan which is known to have been successfully executed under the same error conditions is identified in constant time and is retrieved for execution in time linearly proportional to the error recovery plan length.

Structurally, an experience node 42 maintains pointers to generalized, ordered atomic action nodes previously used to execute the successful error recovery plans which are stored in the experience node. An experience node 42 is named for the destination node of its stored error recovery plans (i.e., the last node in each of the error recovery plans) and is prefixed by exp.

Figure 8:
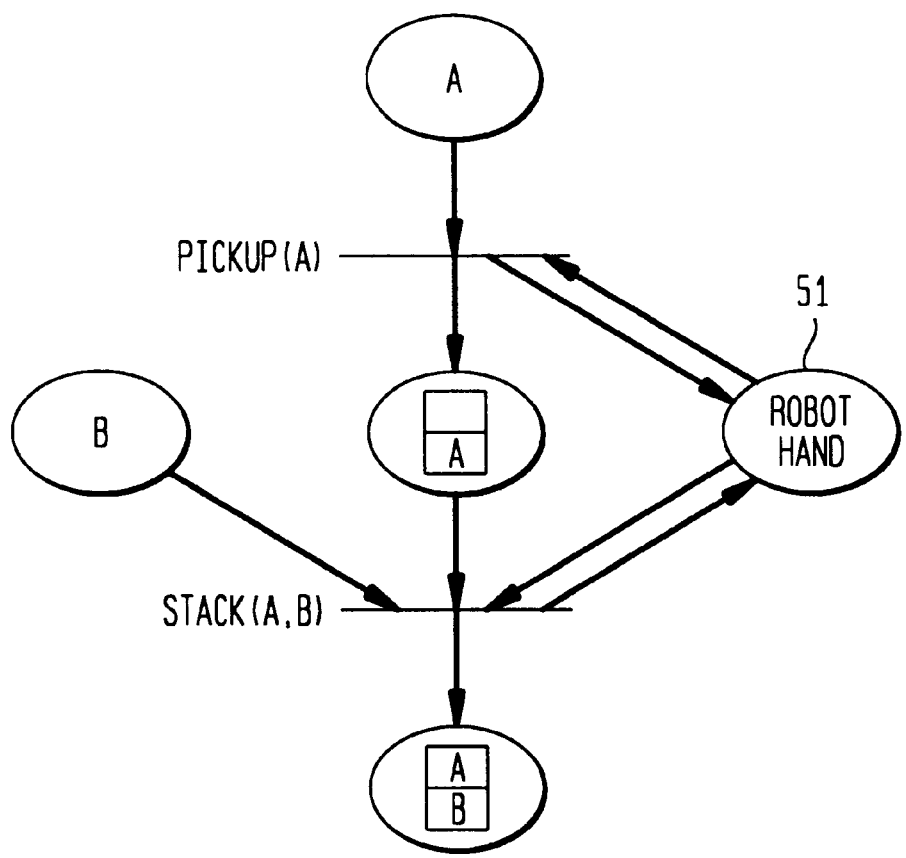
FIG. 8 illustrates the Petri net Model for a Block's World Intelligent Machine.

FIG. 8 represents the Petri net model of an intelligent system 1 that is designed to stack block A on block B. In FIG. 8, the intelligent system 1 includes a robot hand 51, representing an intelligent machine and an associated error recovery unit. The robot hand 51 is tasked to stack block A on block B. Ideally, the robot hand 51 executes the action pickup(A), holding(A) and stack A on B. Thus, the effects of the ideal execution of the action pickup(A) is the state holding(A). An error in pickup(A) results in some other state. The error recovery plan used by the error recovery unit 30 attempts to return the intelligent system 1 to the state resulting from pickup(A), which is holding(A).

As noted above, an experience node 42 is named for the destination node of its stored error recovery plans, and is prefixed by exp. Hence, an experience node for the action pickup(A) and the blocks in the environment of FIG. 8, would be designated as exp-pickup.

All error recoveries performed by the error recovery unit 30 are atomic, point-to-point error recoveries. This means that all error recoveries attempt to take the intelligent system 1 from the error state to the state that was originally expected by the execution of the atomic decomposition of the action node process plan.

To further illustrate the effects of an error in the intelligent system 1 shown in FIG. 8, assume that an error occurs during the execution of the action pickup(A) by the robot hand 51. Through state identification such as the comparison of the actual state information against the effects of the executed action, the error is then found to be that the robot hand 51 picked up block B instead of block A. The resulting error recovery is putdown(B)→pickup(A). The resulting state is holding(A), which is the desired state, and therefore the error recovery is successful.

Only the successful completion of an error recovery permits the creation of an experience node 42. Since the error occurred during the action pickup(A), the experience node 42 is designated for pickup as exp-pickup. The experience node 42 for the successful error recovery described above is shown in FIG. 9. The state information found to be in error was the symbolic representation holding(X) instantiated to holding(B) instead of holding(A).

Figure 9:
FIG. 9 illustrates an Experience Node for the atomic action pickup(x) represented in FIG. 8.
Figure 10:
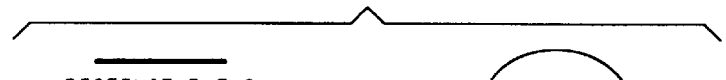
FIG. 10 illustrates an experience node for n=2.
Figure 11:
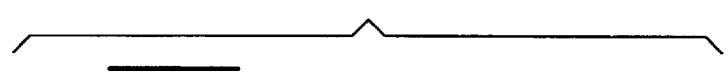
FIG. 11 illustrates an experience node for n=3.
Figure 12:
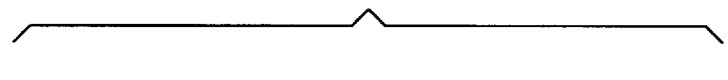
FIGS. 12 and 13 illustrate experience nodes for n=4.
Figure 13:
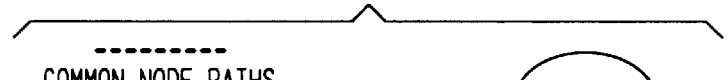

As shown in FIG. 9, the start node for all error recoveries is represented by the common function LOCATE, which functions to determine the object and action that provides the highest state match between the expected and actual object states. The use of the common function locate allows the intelligent system 1 to expeditiously construct and use the experience node. The error condition information, holding(¬X), is interpreted and used as the key identifier for the error recovery plan. The resulting experience node 42 thus contains the start node, LOCATE, the error recovery plan, the destination node, pickup(X) and the error condition information. The last node of the error recovery plan will always be the same, and will always be the node for which the experience node is named. Similarly, as noted above, the start node is the same for all error recoveries and is represented by the common function locate.

Given a general action node network of $|\Sigma|$ action nodes with maximum connectivity, it is possible that an experience node will need to maintain error recovery plans through all the action nodes. In the worst-case complexity analysis, there will therefore be $|\Sigma|!$ such plans. However, in the worst-case complexity analysis of the number of error recovery plans to be explicitly stored by a single experience node 42 (i.e., directed paths through the action node network), the complexity is $|\Sigma|^2$ instead of $|\Sigma|!$.

Because the error recovery unit makes use of symbolic information in generating error recovery plans, state errors are grouped by type instead of individual instantiation, thereby reducing the overall symbolic information necessary to categorize state errors. For example, with the state error, holding(¬X), the object being held could be anything, but is ¬X. Hence the state error is the same whether the object being held is A, B, C or any object other than X. For the error recovery unit 30, this reduction in scope is valid since the error recovery unit focuses on the limited domain of atomic action sequences.

In the symbolic representation of state information, validity is determined through the comparison of the instantiated predicate information contained in the precondition and effects list of each atomic action against the actual state information observed by the system 1. The predicates are represented as well formed formula (WFFS) of a finite number of atomic actions, and hence are denumerable.

If PRE equals the precondition formula for all actions in the maximal set $\Sigma'$, which is a finite set and EFF equals the effect formula for all actions in the maximal set $\Sigma'$, which is also a finite set then the formula subtotal equals:

$$|(PRE \cap EFF) \cup (PRE-EFF) \cup (EFF-PRE)|.$$

The cardinality of the formula subtotal is finite since the union, intersection and/or difference of two finite sets yields the finite set. In each formula there are instantiable objects called terms. For each term in a formula there are two types of symbolic error terms to consider, the correct term and the incorrect term. The importance of this approach is that it allows the number of symbolic error types per formula to be denumerable (i.e., if X is the correct term, then both Y and Z are equivalent to ¬X). Similarly, this approach allows the total number of symbolic error types to be denumerable. Then, $$\text{Num\_Symbolic\_Errortypes\_perFormula} = \sum_{i=o}^{i=n} (m-i),$$

where n equals the total number of terms in the formula; and $$\text{Num\_Symbolic\_Errortypes\_perFormula\_total} = \sum_{j=i}^{j=f} \times \sum_{i=o}^{i=n} (m-i),$$

where f equals the total number of formula.

The total number of symbolic error types may be large, but is not infinite. This is important since the number of error types represents the number of routing keys required to identify all of the possible error recovery plans stored in the union of the experience nodes. On a per-experience node basis, the total number of routing keys is represented by the total number of error types for the formula represented in the precondition and effects lists. This is a finite, denumerable number.

In designing the error recovery unit 30, it is possible to determine the upper bound on the amount of memory required to store the experience nodes 42 and the associated error recovery plans, and to keep the memory requirements to a minimum. The memory characteristics are established by considering that, as a maximum, each experience node 42 will have all of the nodes from the maximum set $\Sigma'$ represented with a fully connected link matrix (each node is connected to each other node). Hence, each experience node 42 will maintain a maximum of n−1 nodes including the locate node, with a maximum of n−1 links per node, plus the destination node (i.e., the node for which the experience node is named and which has no outgoing links).

The maximum total memory required to store each experience node 42 is then M(n+1); and the maximum total memory needed to store the links for each experience node 42 is iL, where M represents the amount of memory needed to store a single node;

L represents the amount of memory needed to store a single link;

n represents the total number of nodes in the maximal set $\Sigma'$; and $i=1+2\times(n-2)+(n-2)\times(n-3)$ represents the maximum number of links in one experience node.

Then, $n(N(n+1)+iL)$ represents the total memory needed to store a maximum configuration of all experience nodes, $O(n^3)$.

The complexity of an experience node 42 grows with the number of errors encountered and successfully recovered from. Therefore the maximum is not achieved until all error types are encountered for each atomic action.

As noted above, a fully connected action node network consists of $\Sigma$ action nodes. Further, all error recoveries start from the same node, denoted locate. Thus the network actually has $|\Sigma|+1$ nodes. Since the network is fully connected, each node is connected to $|\Sigma|$ other nodes. Thus to each node is connected $|\Sigma|$ outgoing arcs and $|\Sigma|$ incoming arcs, or $2\times|\Sigma|$ total arcs per node. However, since an outgoing arc from one node is an incoming arc from another node, the total number of arcs in the network is $(|\Sigma|+1)\times|\Sigma|=|\Sigma|^2+|\Sigma|=O\times(|\Sigma|^2)$.

A distinct path is defined to be a directed error recovery path maintained by an experience node. In a distinct path, only the start node and the destination node are common to another path emanating from the same start node and ending in the same destination node. If the paths are generated from an action node network with an arbitrary connectivity scheme and there are $D_i$ incoming arcs to the destination node and $S_o$ outgoing arcs from the start node, the maximum possible number of distinct paths is min $(D_i, S_o)$. Then, based on the definition of the experience node, the maximum number of possible error recovery plans, $EP_{max}$, distinct and/or common-node, for any one task is equal to the number of error recovery requests $ER_{req}$ for that task. It is possible in the limiting case that all of the nodes in the action node network will be numbers of at least one error recovery. Therefore, in the limiting case a single experience node 42 will need to store a maximum of $|\Sigma|$ node-pointers.

The number of paths, both common-node and distinct, that an experience node 42 would have to explicitly store in the limiting case is $O(|\Sigma|^2)$. The development is shown in Table 1, where $|\Sigma|+1=n=5$. In Table 1, $CN_x$ equals the common node path through node $N_x$ where $N_x$ is the first common node and $Nodes_{max}$ equals the maximum number of nodes in the network including the start and end node.

TABLE 1

Total Number of Paths Needed to be Stored by an Experience Node

| Nodes$_{max}$ | Distinct Paths | CN$_3$ | CN$_4$ | CN$_5$ | ... | CN$_n$ |
|---|---|---|---|---|---|---|
| 2 | 1 | 0 | 0 | 0 | ... | 0 |
| 3 | 2 | 0 | 0 | 0 | ... | 0 |
| 4 | 3 | 1 | 1 | 0 | ... | 0 |
| 5 | 4 | 2 | 2 | 2 | ... | 0 |
| ⋮ | ⋮ | ⋮ | ⋮ | ⋮ | ... | ⋮ |
| n | n − 1 | n − 3 | n − 3 | n − 3 | ... | n − 3 |

In general, the total number of paths is given by the first of the two equations below and the complexity is given by the second equation:

P total=$(1+(n-2))_{distinct\ space\ paths}+(n-2)\times n-3\ (_{common-node\ paths})$ P total=$n_2-4n+5$=equals $O(n^2)$ The description so far has been with respect to individual experience nodes 42. The maximum number of experience nodes 42 is limited by the maximum number of nodes in the action node network, here N. Thus, the number of experience nodes, $E_xN$, is directly proportional to, and in fact grows linearly with, the number of actions in the action node network of the primitive structure database 32. Thus, $E_xN_{max}$∝to n; and $E_xN$ is $\leq n$ Each experience node 42 stores only successfully executed error recovery plans. In the limiting case, every possible error that could occur will have occurred, and will have been recovered from successfully. Thus, every action node in the action node network will have a corresponding experience node 42. Each experience node 42 possesses every possible error recovery plan for its destination action. Hence, once the destination action is known, the experience node 42 maintaining the appropriate error recovery plan is automatically known in constant timing a map interface node. Through the identification of the error conditions, the routing key through the experience node 42 is determined.

There are several benefits to using routing keys. The first is that the $O(|\Sigma|!)$ possible plans can be stored in a $O(|\Sigma|^2)$ network by using a link identifier to indicate a multi-wave branch. The path to take is thus accessed in constant time. Plan retrieval, obtained by traversing the path from the start node to the destination node using the routing key, is a linear search accomplished in $O(|\Sigma|)$ in the worst case, and $O(|\Sigma|/2)$ in the average case. Further, the stored plans are not ideal plans. The stored plans represent plans that were generated for and successfully executed by a particular intelligent network, under the same error conditions. Therefore, there are no extraneous plans. With respect to overall error recovery in the limiting case, the error recovery unit permits $O(|\Sigma|)$ worst case and $O(|\Sigma|/2)$ average case error recovery plan generation and retrieval. With respect to error recovery in the non-limiting case, the error recovery unit permits $O(|\Sigma|)$ worst case and $O(|\Sigma|/2)$ average case error recovery plan retrieval for previously encountered errors. For newly encountered errors, the error recovery time complexity is a function of the search string used to search the primitive structure database action node network. In the worst case, this complexity is $O((|\Sigma|^2+|\Sigma|) \log (1/W_{min})0.5))$.

The foregoing description of the system and method for characterizing and repairing intelligent systems is illustrative, and variations in construction and implementation will occur to persons skilled in the art. For instance, while reference has been made to networks involving robotic systems, the invention can be advantageously applied to many other categories of systems, such as servocontrollers, communications networks, neural networks and others. The scope of the invention is therefore intended to be limited only by the following claims.

What is claimed is:

1. A method for performing actions in a system, comprising:

detecting a second state of the system after the system performs a first action transitioning from a first state;

comparing the detected second state to an expected second state of the system;

if the detected second state differs from the expected second state, performing one or more second actions based on at least an error recovery history for the system.

2. The method of claim 1, wherein the one or more second actions comprise a transition path from the detected second state to a third state.

3. The method of claim 2, wherein the one or more second actions are further based on a first trigger, a trigger being one or more actions causing the system to transition from a previous state to a subsequent state.

4. The method of claim 3, wherein the one or more second actions are further based on a difference between the detected second state and the expected second state.

5. The method of claim 4, wherein, if the detected second state differs from the expected second state, further building an experience node storing recovery information including at least one of information relating to the first trigger, information relating to the difference between the detected second state and the expected second state, and information relating to the one or more second actions.

6. The method of claim 4, wherein performing the one or more second actions is based on one or more experience nodes, an experience node being a node containing information relating to one or more triggers, differences between detected states and expected states and one or more recovery actions.

7. The method of claim 4, further comprising, if the detected second state differs from the expected second state, storing information to an experience node, including at least information relating to the first trigger, the difference between the detected second state and the expected second state, and the one or more second actions.

8. The method of claim 7, wherein the experience node contains information relating to previous experiences of the system, including a database of triggers, a database of differences relating to detected and excepted states, and a database of recovery actions, a recovery action being an action used to transition the system from a detected state to a desired state.

9. The method of claim 8, further comprising the step of generating an experience map for the system, the experience map comprising a plurality experience nodes.

10. The method of claim 8, further comprising updating the experience node based on newly encountered detected states.

11. The method of claim 8, further comprising performing one or more learned actions based on at least the first trigger, the difference between the detected second state and the expected second state, and the one or more second actions.

12. The method of claim 4, wherein the system is based on at least a neural network.

13. An apparatus for characterizing a system, comprising:

a processor unit that controls the system to perform one or more sets of actions; and a recovery unit, coupled to the processor unit, that detects states of the system;

wherein at least one of the processor unit and recovery unit determines a difference between the detected states and expected state of the system, and if a first detected state differs from a first expected state, causes the system to perform one or more recovery actions based on at least an error recovery history of the system.

14. The apparatus of claim 13, wherein the one or more recovery actions comprise a transition path from the first detected state to a recovery state.

15. The apparatus of claim 14, wherein the one or more actions are further based on a first trigger relating to the first detected state, a trigger being one or more actions causing the system to transition from a previous state to a subsequent state.

16. The apparatus of claim 15, wherein the recovery unit further builds one or more experience nodes storing recovery information, including at least information relating to the first trigger, information relating to the difference between the detected first state and the expected first state, and information relating to the one or more recovery actions.

17. The apparatus of claim 16, wherein the recovery information comprises at least a frequency of the difference between the first detected state and the first expected state.

18. The apparatus of claim 16, wherein the recovery information comprises at least a frequency of the one or more recovery actions.

19. The apparatus of claim 16, wherein the recovery unit includes an experience map for the system, the experience map including at least a plurality of experience nodes generated by the recovery unit.

20. The apparatus of claim 16, further comprising a communication interface, the one or more experience nodes being communicated to other systems via the communication interface.

21. The apparatus of claim 16, wherein the recovery unit experience map continuously monitors the system, and updates the experience map.

22. The method of claim 1, wherein the one or more second actions comprise a transition path from the detected second state to a third state.

* * * * *